Jan. 23, 1945.  S. B. CRARY  2,367,930
CONTROL SYSTEM
Filed June 11, 1943
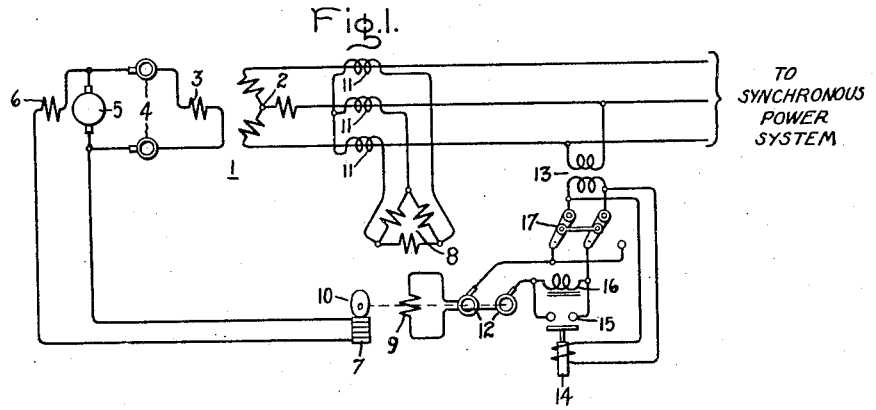
Fig. 1.
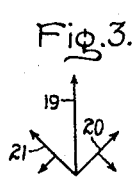
Fig. 3.
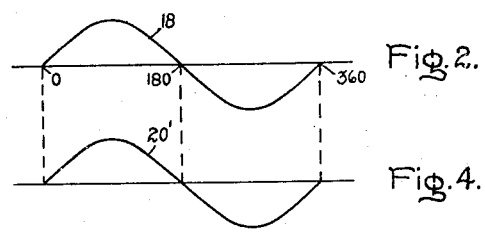
Fig. 2.
Fig. 4.
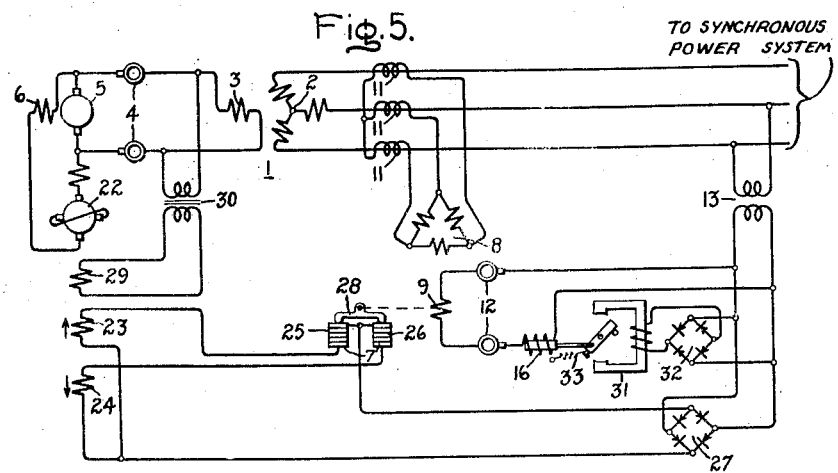
Fig. 5.
Inventor:
Selden B. Crary,
by Harry E. Dunham
His Attorney.

Patented Jan. 23, 1945

2,367,930

UNITED STATES PATENT OFFICE 2,367,930

CONTROL SYSTEM

Selden B. Crary, Schenectady, N. Y., assignor to General Electric Company, a corporation of New York Application June 11, 1943, Serial No. 490,462

7 Claims. (Cl. 172—246)

This invention relates to control systems and more particularly to improvements in automatic power factor regulators for synchronous dynamoelectric machines.

Most alternating-current power is today generated by synchronous generators. Many large users of alternating-current power convert it to mechanical power by means of synchronous motors and in some cases they also have local synchronous generators which are connected in parallel with the main power supply synchronous generators and which are for the purpose of carrying some of the plant load. As synchronous machines will operate over a wide range of power factors but as power factors other than unity may represent a loss, penalties are sometimes provided for low power factor when contracts for the purpose of alternating-current power are made. It is therefore not uncommon to provide synchronous machines with automatic power factor regulators so as to keep the machines operating at as high a power factor as practical and thus reduce losses and avoid the penalties for low power factor. Another advantage of power factor regulators is that they change the excitation with changes in load and consequently lighter synchronous machines can be used because the automatic change in excitation makes it possible to use machines with reduced pullout torque.

It has been found, however, that low voltage on the power system caused in any manner, such as by some abnormal transient condition as the occurrence of a short circuit on a transmission line or the tripping out of a section of the supply system, will frequently produce loss of synchronism on the part of synchronous machines when they are provided with power factor regulators and that this occurs more frequently when the machines are of the light-weight low pullout torque type.

In accordance with this invention the above difficulty is eliminated by providing automatic means responsive to the abnormal system voltage condition for changing the excitation of the synchronous machine regardless of the action of the power factor regulator.

An object of the invention is to provide a new and improved control system.

Another object of the invention is to provide a new and improved voltage biased power factor regulator system for synchronous dynamoelectric machines.

The invention will be better understood from the following description taken in connection with the accompanying drawing and its scope will be pointed out in the appended claims.

In the drawing Fig. 1 illustrates diagrammatically an embodiment of the invention, Figs. 2, 3 and 4 are diagrams for explaining the operation of the power factor regulator, and Fig. 5 is a modification of Fig. 1.

Referring now to Fig. 1 of the drawing, there is shown therein a synchronous machine 1 which is shown by way of example as having a three-phase Y-connected stator 2 and a direct-current rotor 3 connected by way of slip rings 4 to an exciter 5. The exciter may in turn be excited in any well known manner and it is shown as a self-excited machine having a shunt field winding 6. In circuit with this field winding is a regulating resistance 7 which may be of any suitable type and which is shown as of the stack or pile type which responds to slight variations in pressure to produce wide changes in resistance.

The excitation controlling resistor 7 is operated by an automatic power factor regulator which is shown by way of example as a machine having a three-phase stator winding 8 and a single-phase rotor winding 9. The construction may be similar to that of the well-known Selsyn device. The rotor 9 is connected by any suitable linkage 10 so that slight angular movement thereof will operate the resistance element 7 throughout its entire resistance range.

The stator 8 of the power factor regulator is excited in proportion to the current in the armature 2 of the synchronous machine and the rotor 9 is excited in proportion to the voltage of one of the phases of the armature 2, although it will be obvious to those skilled in the art that the stator 8 could be voltage responsive and the rotor 9 could be current responsive if desired. As shown, three Y-connected current transformers 11 are connected to the terminals of the stator 8 of the power factor regulator. The rotor 9 is connected through slip rings 12 to the secondary winding of a potential transformer 13 connected between two of the lines of the three-phase system to which the armature 2 of the synchronous machine is connected.

For modifying the action of the regulator in accordance with the voltage of the synchronous machine there is provided a low voltage relay 14 having a pair of normally closed contacts 15 connected to short circuit a reactor 16 which is connected in series with the rotor 9.

For adapting the control system to either a synchronous generator or a synchronous motor a polarity reversing switch 17 is connected between the secondary winding of the potential transformer 13 and the rotor 9.

The operation of Fig. 1 is as follows: Assume that the machines 1 and 5 are being driven at normal speed by any suitable means (not shown) and that the armature 2 of the synchronous machine is delivering current to a load through the three-phase circuit to which it is shown connected. Under these circumstances the stator 8 of the power factor regulator will produce a rotating magnetic field whose intensity is proportional to the current in the armature 2 and whose speed is proportional to the synchronous speed of the system to which the machine 2 is connected. This rotating stator field may be represented by the sine wave 18 in Fig. 2.

The single-phase excitation of the rotor 9 may be represented by the vector 19 in Fig. 3 and, as is well known, such a vector may be resolved into two components of half its magnitude which rotate at the same speed but in opposite directions, as indicated by the components 20 and 21. One of these components, such, for example, as 20, will rotate in the same direction and at the same speed as the rotating magnetic field of the stator 8 and this may be represented by the wave 20' in Fig. 4 which is placed vertically below Fig. 2 so that vertically spaced points on the two waves have the same relative phase displacement. The other component 21 which rotates in the opposite direction will merely produce a slight amount of vibration or oscillation which is negligible. The waves 18 and 20' in Figs. 2 and 4 are shown in phase with each other. If now the current in the armature 2 of the main synchronous machine should change its phase with respect to the voltage of this machine the field of the stator would either advance or move backward with respect to the forward rotating component of the rotor field and this would cause a torque to be produced in the rotor tending to displace it in phase by the same amount. Consequently, any change in power factor on the machine 2 will cause the power factor regulator to produce a torque, which torque will vary oppositely in direction depending upon which way the power factor has changed. These changes in torque when applied to the resistor will change the excitation of the synchronous machine in such a manner as to tend to restore the power factor to the value for which the regulator is set. This setting can easily be made in a number of different ways, such, for example, as rotating the stator 8 on its axis. As the power factor regulator and the resistor 7 are, in effect, an amplifier which causes large changes in excitation in response to small changes in power factor from the desired value, it will be seen that the regulator will prevent the power factor from changing by any appreciable amount.

As long as the voltage of the armature circuit of the synchronous machine is substantially normal, the reactor 16 is short circuited by the undervoltage relay 14 but as soon as the voltage drops substantially below normal the relay 14 drops out and, in effect, connects the reactor 16 in circuit with the rotor 9 of the power factor regulator. This retards the phase of the current in the rotor which is the equivalent of the armature current in the machine 2 becoming more leading in phase.

A reduction in armature voltage without an accompanying change in excitation always makes the synchronous machine 2 operate overexcited in comparison with the way it was operating before the armature voltage decreased. If the synchronous machine is a motor, such overexcited operation causes the power factor to become less and less lagging or more and more leading, whereas if the machine is a synchronous generator it causes the power factor to become less and less leading or more and more lagging. However, in either case, the power factor regulator will act to reduce the excitation so as to try to remove the overexcited condition and thus restore the power factor to the value for which the regulator is set. This is believed to be exactly the wrong thing to do because such reduction in excitation during the low voltage condition tends to reduce the synchronizing torque of the machine with the result that the machine stability is reduced to a dangerously low value and it not infrequently pulls out of step, especially if it is a lightweight machine having an inherently low pull-out torque. Therefore, the effect of the insertion of the reactor 16 will be to cause the power factor regulator to increase the excitation if the machine is a generator.

If the machine is a motor it is necessary to operate the reversing switch 17 so as to reverse the polarity of the rotor 9 of the power factor regulator. This is because with respect to the voltage of a synchronous system the current of a synchronous motor is 180 degrees out of phase with the current of a synchronous generator. Thus, reversing the polarity of the rotor compensates for such a reversal in the phase of the armature current if the machine is a motor and consequently the system including the reactor and the undervoltage relay 14 will now operate in the proper manner when the machine 1 is a synchronous motor.

In Fig. 5 the excitation is controlled by a buck and boost generator 22 of the so-called cross axis armature reaction excited type. This machine has a pair of buck and boost control field windings 23 and 24 connected respectively in circuit with resistance stacks 25 and 26. The field 23 and its resistance stack 25 are connected in parallel circuit relation with the field 24 and its resistance stack 26 across the output of a rectifier 27 which is connected to the secondary winding of the potential transformer 13. The resistance stacks 25 and 26 are changed oppositely by means of a pivoted yoke or operating member 28 mechanically actuated by the rotor 9 of the power factor regulator. Thus, whenever the power factor regulator requires an increase in excitation the resistance of the stack 25 in series with the boost winding decreases and the resistance 26 in series with the buck winding 24 is increased. In other words, the yoke 28 is turned counterclockwise (in the drawing). Conversely, for an opposite change in excitation the yoke is turned clockwise.

In order to prevent hunting of the regulator system an anti-hunting winding 29 is energized in accordance with the rate of change of excitation by means of a stabilizing transformer 30 connected across the field 3. The reactor 16 instead of being cut in and out of the control circuit of the power factor regulator in one step is controlled in proportion to the voltage of the main system by means of a torque motor 31 energized through a rectifier 32 from the potential transformer 13. This torque motor is connected to a movable core in the reactor 16, the arrangement being such that when the voltage decreases a spring 33 overcomes the electromagnetic torque of the torque motor and moves the core into the reactor winding, thus increasing its reactance.

No polarity reversing switch has been shown in Fig. 5 but it will be obvious to those skilled in the art that the system can readily be adapted to either a synchronous motor or a synchronous generator by merely reversing the connections of the rotor 9 of the power factor regulator.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of United States is:

1. In combination, an alternating-current power circuit having a normal voltage, a synchronous dynamo-electric machine connected thereto, means for controlling the excitation of said machine, an automatic power factor regulator for said machine for operating said excitation controlling means so as to hold constant power factor, and means responsive to an abnormal voltage condition of said circuit for causing an opposite excitation change of said machine to that which said regulator would ordinarily produce.

2. In combination, an alternating-current power circuit having a normal voltage, a synchronous dynamo-electric machine connected thereto, means for controlling the excitation of said machine, an automatic power factor regulator for said machine for operating said excitation controlling means so as to hold constant power factor, and means responsive to an abnormal voltage condition of said circuit for modifying the action of said regulator so as to cause it to reverse its effect on the excitation of said machine.

3. In combination, an alternating-current power circuit having a normal voltage, a synchronous dynamo-electric machine connected thereto, means for controlling the excitation of said machine, an automatic power factor regulator for said machine for operating said excitation controlling means so as to hold constant power factor, and means responsive to an abnormally low voltage of said circuit for increasing the excitation of said machine.

4. In combination, an alternating-current power circuit having a normal voltage, a synchronous dynamo-electric machine connected thereto, means for controlling the excitation of said machine, an automatic power factor regulator for said machine for operating said excitation controlling means so as to hold constant power factor, and means responsive to an abnormally low voltage of said circuit for increasing the excitation of said machine regardless of the normal tendency of said regulator to decrease the excitation.

5. In combination, an alternating-current power circuit having a normal voltage, a synchronous dynamo-electric machine connected thereto, means for controlling the excitation of said machine, an automatic power factor regulator for said machine for operating said excitation controlling means so as to hold constant power factor, and means responsive to abnormally low voltage of said circuit for reversing the action of said regulator whereby said regulator increases the excitation of said machine instead of decreasing it during it during the existence of said abnormally low voltage.

6. In combination, an alternating-current power circuit having a normal voltage, a synchronous dynamo-electric machine connected thereto, means for controlling the excitation of said machine, an automatic power factor regulator for said machine for operating said excitation controlling means so as to hold constant power factor, and means responsive to an abnormally low voltage of said circuit for changing the power factor setting of said regulator so as to cause said regulator to increase the excitation of said machine instead of decreasing it during the existence of said abnormally low voltage.

7. In combination, an alternating-current power circuit having a normal voltage, a synchronous dynamo-electric machine connected thereto, means for controlling the excitation of said machine, an automatic power factor regulator for said machine for opearting said excitation controlling means so as to hold constant power factor, and means responsive to an abnormally low voltage of said circuit for changing the power factor setting of said regulator in proportion to the degree of abnormality of said voltage so as to cause said regulator to increase the excitation of said machine instead of decreasing it due to the existence of said abnormally low voltage.

SELDEN B. CRARY.